UNITED STATES PATENT OFFICE.

AMANDUS BARTELS, OF HARBURG-ON-THE-ELBE, GERMANY, ASSIGNOR, BY MESNE ASSIGNMENTS, TO THE CHEMICAL FOUNDATION, INC., A CORPORATION OF DELAWARE.

PROCESS FOR THE MANUFACTURE OF CASEIN ESPECIALLY ADAPTED FOR THE PRODUCTION OF ARTIFICIAL HORNLIKE MASSES.

1,320,666.

Specification of Letters Patent. Patented Nov. 4, 1919.

No Drawing. Application filed March 3, 1917. Serial No. 152,393.

*To all whom it may concern:*

Be it known that I, Dr. AMANDUS BARTELS, a subject of the King of Prussia, residing at Harburg-on-the-Elbe, Buxtehuderstrasse 102, Kingdom of Prussia, German Empire, have invented certain new and useful Improvements in Processes for the Manufacture of Casein Especially Adapted for the Production of Artificial Hornlike Masses, of which the following is a specification.

The present invention relates to a process of treating casein, for the production of artificial horn-like material.

The freshly precipitated humid casein from skim-milk imparts to artificial horn-like material formed or derived therefrom a porous character. This porous character is particularly disadvantageous in such material.

In accordance with my process I take freshly precipitated casein (curd), before drying, and subject the same to a strong or powerful grinding action. This grinding action serves to completely destroy the natural layer-structure of the casein, and obtains the finest division of the small particles of the casein. The fresh or humid casein thus treated or ground is now allowed to dry. The dried casein is subsequently moistened, and this mass is then kneaded under high pressure. As a result, there is obtained a clear, transparent, and completely uniform artificial horn-like material free from pores. This material is of course allowed to dry and harden.

It is also found that by the treatment of the casein as hereinabove set forth, the same is adapted to receive or take up a large amount of filling material or agents. The filling material is preferably added to the fresh or humid casein prior to its grinding treatment, and such grinding treatment serves also to grind or finely divide the filling material, which aids in the grinding of the casein.

Any suitable apparatus may be employed to finely divide or grind the fresh or humid casein, such as rubbing or grinding devices, kneading machines, rolling mills, or other apparatus to effect the finest division and distribution of the plastic or humid casein. Where the humid casein contains a filling material, I preferably employ a rolling mill, to grind the same.

Having thus described my invention what I claim is:

1. The herein described process, which consists in subjecting casein moistened with water solely to a grinding action to finely divide the same and destroy its natural layer-structure, and subsequently working the casein thus treated for producing a horn-like material.

2. The herein described process, which consists in subjecting casein moistened with water solely to a grinding action to finely divide the same and destroy its natural layer-structure, allowing the casein thus treated to dry, moistening the dried casein, and kneading the same into a horn-like material.

3. The herein described process, which consists in incorporating with casein moistened with water solely a filling material, subjecting the mass thus obtained to a grinding action to finely divide the filling and casein and destroy the natural layer-structure of the casein, allowing the mass thus obtained to dry, moistening the dried mass, kneading the mass thus obtained into a horn-like material, and allowing such material to dry and harden.

4. The herein described process, which consists in subjecting casein moistened with water solely to a grinding action to finely divide the same and destroy its natural layer-structure, and subsequently working the casein thus treated under pressure for producing a horn-like material.

5. The herein described process, which consists in subjecting casein moistened with water solely to a grinding action to finely divide the same and destroy its natural layer-structure, allowing the casein thus treated to dry, moistening the dried casein and kneading the same under high pressure into a horn-like material.

6. The herein described process which consists in incorporating with casein moistened with water solely a filling material, subjecting the mass thus obtained to a grinding action to finely divide the filling and casein and destroy the natural layer-structure of the casein, allowing the mass thus obtained to dry, moistening the dried mass, kneading the mass thus obtained under pressure into a horn-like material and allowing such material to dry and harden.

In testimony whereof I affix my signature in the presence of two witnesses.

Dr. AMANDUS BARTELS.

Witnesses:
 FRANCIS R. STEWART,
 LOUIS F. DILGER.